(12) United States Patent
Asano et al.

(10) Patent No.: US 6,907,861 B2
(45) Date of Patent: Jun. 21, 2005

(54) INJECTION QUANTITY CONTROL DEVICE OF DIESEL ENGINE

(75) Inventors: Masahiro Asano, Kariya (JP); Yoshihiro Narahara, Kariya (JP); Eiji Takemoto, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/866,254

(22) Filed: Jun. 14, 2004

(65) Prior Publication Data
US 2004/0267433 A1 Dec. 30, 2004

(30) Foreign Application Priority Data

Jun. 27, 2003 (JP) ........................................ 2003-185633
Dec. 17, 2003 (JP) ........................................ 2003-419915

(51) Int. Cl.$^7$ ................................................ F02D 7/00
(52) U.S. Cl. ........................................ 123/395; 123/436
(58) Field of Search ................................ 123/319, 344, 123/395, 436, 434, 445

(56) References Cited

U.S. PATENT DOCUMENTS 5,385,129 A    1/1995   Eyberg 6,694,945 B2 * 2/2004 Kawaguchi et al. ........ 123/299

FOREIGN PATENT DOCUMENTS

| DE | 19812305 A1 | 9/1999 |
| EP | 1215386 A2 | 6/2002 |
| EP | 1340900 A2 | 9/2003 |
| JP | 11-294227 | 10/1999 |
| JP | 2002-295291 | 10/2002 |

* cited by examiner

Primary Examiner—Bibhu Mohanty
(74) Attorney, Agent, or Firm—Nixon & Vanderhye P.C.

(57) ABSTRACT

A fuel injection control device of a diesel engine performs a learning injection during a no-injection period, in which a command injection quantity is zero or under. A difference between a variation in the engine rotation speed in the case where the learning injection is performed and a variation in the engine rotation speed in the case where the learning injection is not performed is calculated as a rotation speed increase. A torque proportional quantity is calculated by multiplying the rotation speed increase by the engine rotation speed at the time when the learning injection is performed. An injection correction value is calculated from a deviation between the actual injection quantity, which is estimated from the torque proportional quantity, and the command injection quantity. The command injection quantity is corrected based on the injection correction value.

22 Claims, 5 Drawing Sheets

INJECTION QUANTITY CONTROL DEVICE OF DIESEL ENGINE

CROSS REFERENCE TO RELATED APPLICATIONS

This application is based on and incorporates herein by reference Japanese Patent Applications No. 2003-185633 filed on Jun. 27, 2003 and No. 2003-419915 filed on Dec. 17, 2003.

BACKGROUND OF THE INVENTION

1. Field of the Invention

The present invention relates to a fuel injection control device, which performs learning of an injection quantity of a diesel engine.

2. Description of Related Art

A pilot injection for injecting a small amount of fuel before a main injection is performed in order to reduce combustion noise and to inhibit generation of nitrogen oxides in a diesel engine. Since a command value of an injection quantity of the pilot injection is small, accuracy of the small-amount injection should be improved in order to sufficiently exert the effect of the pilot injection of reducing the combustion noise and of inhibiting the nitrogen oxides. Therefore, learning should be preferably performed in the software for detecting a deviation between the command injection quantity of the pilot injection and a quantity of the actually injected fuel (an actual injection quantity) and for correcting the deviation.

However, it is difficult to directly measure the actual injection quantity while a vehicle is traveling. Therefore, conventionally, a method of continuously sensing an air fuel ratio, a pressure in a cylinder or the like as a substitute for the actual injection quantity has been employed as disclosed in Unexamined Japanese Patent Application Publication No. H11-294227, for instance. In this method, the deviation of the injection quantity can be detected accurately, and meanwhile, the deviation can be detected in an entire range of an operating mode.

As an alternative, a method of correcting the deviation of the injection quantity based on a correction value used in feedback control of rotation speed such as ISC (idling rotation speed control) has been also employed, for instance, as disclosed in Unexamined Japanese Patent Application Publication No. 2002-295291. For instance, on the condition that the rotation speed of the engine is preliminarily found to coincide with desired idling rotation speed when the actual injection quantity is 5 mm$^3$/st, the command injection quantity is gradually changed so that the rotation speed of the engine coincides with the idling rotation speed. The injection quantity at the time when the rotation speed sensed by the rotation speed sensor or the like coincides with the idling rotation speed can be regarded as 5 mm$^3$/st, even though the injection quantity is not measured directly. In this method, as explained above, a generally used sensor such as the rotation speed sensor is used. Therefore, no additional device is required and an increase in the cost can be inhibited.

However, in the method disclosed in Unexamined Japanese Patent Application Publication No. H11-294227, the air fuel ratio sensor and the cylinder inner pressure sensor, which are not mounted in the vehicle generally, are necessary. Thus, the additional devices are required and the cost is increased.

In the method disclosed in Unexamined Japanese Patent Application Publication No. 2002-295291, a unique relationship between the engine rotation speed and the injection quantity is broken because of a variation among cylinders of the engine or a fluctuation of load factors applied to the engine such as exterior loads including an air conditioner. The learning is performed based on the relationship between the rotation speed and the command injection quantity balanced under the influence of the fluctuation of the load factors. Therefore, it is difficult to accurately perform the learning of the injection quantity.

For instance, the engine rotation speed increases as the injection quantity increases and decreases as the injection quantity decreases. In addition, the engine rotation speed also fluctuates in accordance with the state of the loads of the air conditioner, an alternator and the like, which are applied to the engine. Therefore, the actual injection quantity cannot be sensed accurately by merely monitoring the engine rotation speed.

SUMMARY OF THE INVENTION

It is therefore an object of the present invention to provide a fuel injection control device of a diesel engine capable of accurately performing learning of an injection quantity without an increase of a cost due to additional devices such as sensors.

According to an aspect of the present invention, a fuel injection control device of an internal combustion engine includes determining means, commanding means, sensing means, first calculating means, second calculating means, and third calculating means. The determining means determines whether a learning condition for performing a learning injection (an injection for learning) in a specific cylinder of the engine through an injector is established. The commanding means commands the injector to perform the learning injection in the specific cylinder when the learning condition is established. The sensing means senses rotation speed of the engine as engine rotation speed. The first calculating means calculates a difference between a variation in the engine rotation speed in the case where the learning injection is performed and a variation in the engine rotation speed in the case where the learning injection is not performed as a rotation speed increase. The second calculating means calculates an actual injection quantity of the fuel actually injected from the injector or an actual injection quantity related value related to the actual injection quantity, based on the calculated rotation speed increase. The third calculating means calculates a difference between the calculated actual injection quantity and the command injection quantity which the injector is commanded to inject or a difference between the calculated actual injection quantity related value and a command injection quantity related value related to the command injection quantity as an injection correction value.

The difference between the variation in the engine rotation speed in the case where the learning injection is performed and the variation (the estimated value) in the engine rotation speed in the case where the learning injection is not performed is calculated as the rotation speed increase between the case where the learning injection is performed and the case where the learning injection is not performed. If the engine rotation speed at the time when the learning injection is performed is the same, the rotation speed increase is the same independently of the fluctuation of a load (for instance, a load of an air conditioner or an alternator) applied to the engine. Therefore, the actual injection quantity of the fuel actually injected from the injector or the actual injection quantity related value can be accurately calculated based on the rotation speed increase, which is calculated from the outputs of the sensing means. The variation in the engine rotation speed in the case where the learning injection is not performed can be estimated from the variation in the engine rotation speed before the learning injection is performed, or from the variations in the rotation speed before and after the time when the engine rotation speed is increased through the learning injection.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS

First Embodiment

Figure 1:
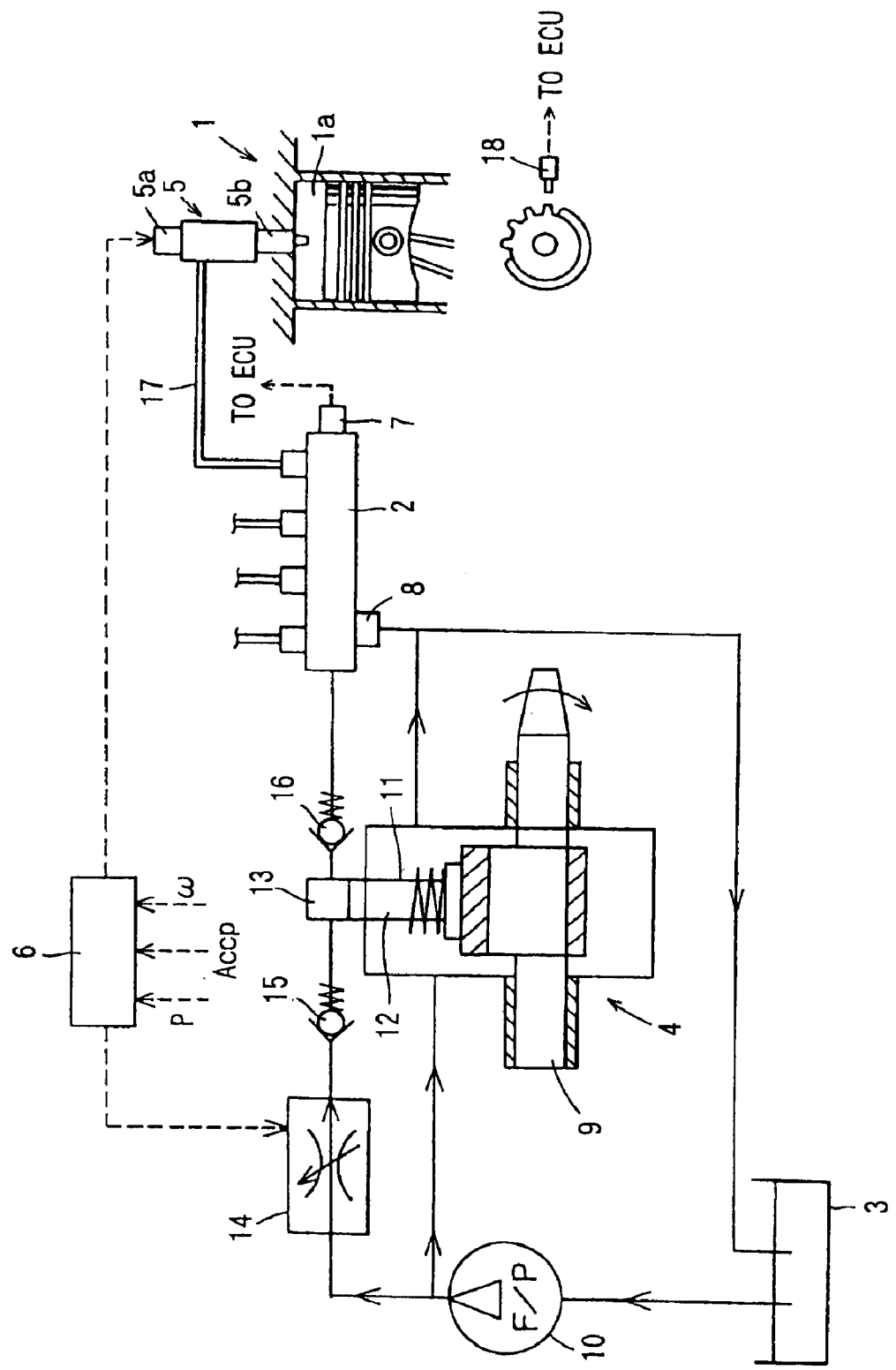
FIG. 1 is a diagram showing an entire structure of a fuel injection system of a diesel engine according to a first embodiment of the present invention.

Referring to FIG. 1, a fuel injection system of a diesel engine according to a first embodiment of the present invention is illustrated.

The fuel injection system shown in FIG. 1 is applied to a four-cylinder diesel engine (an engine) 1, for instance. The fuel injection system includes a common rail 2 for accumulating high-pressure fuel, a fuel supply pump 4 for pressurizing the fuel drawn from a fuel tank 3 and for supplying the fuel into the common rail 2, injectors 5 for injecting the high-pressure fuel, which is supplied from the common rail 2, into cylinders (combustion chambers 1a), and an electronic control unit (an ECU) 6 for electronically controlling the system.

The ECU 6 sets a target rail pressure of the common rail 2. The common rail 2 accumulates the high-pressure fuel supplied from the fuel supply pump 4 to the target rail pressure. A pressure sensor 7 and a pressure limiter 8 are attached to the common rail 2. The pressure sensor 7 senses a pressure of the fuel accumulated in the common rail 2 (a rail pressure P) and outputs the rail pressure P to the ECU 6. The pressure limiter 8 limits the rail pressure P so that the rail pressure P does not exceed a predetermined upper limit.

The fuel supply pump 4 includes a camshaft 9 driven by the engine 1 to rotate, a feed pump 10 driven by the camshaft 9 to draw the fuel from the fuel tank 3, a plunger 12 reciprocating in a cylinder 11 in synchronization with the rotation of the camshaft 9, an electromagnetic flow control valve 14 for controlling the quantity of the fuel drawn from the feed pump 10 into a pressurizing chamber 13 inside the cylinder 11, and the like.

In the fuel supply pump 4, the quantity of the fuel discharged from the feed pump 10 is controlled by the electromagnetic flow control valve 14 when the plunger 12 moves from a top dead center to a bottom dead center in the cylinder 11. Accordingly, the fuel opens a suction valve 15 and is drawn into the pressurizing chamber 13. Then, when the plunger 12 moves from the bottom dead center to the top dead center in the cylinder 11, the plunger 12 pressurizes the fuel in the pressurizing chamber 13. The pressurized fuel opens a discharging valve 16 and is pressure-fed into the common rail 2.

The injectors 5 are mounted on the respective cylinders of the engine 1 and are connected to the common rail 2 through high-pressure pipes 17 respectively. Each injector 5 includes an electromagnetic valve 5a, which operates responsive to the command of the ECU 6, and a nozzle 5b for injecting the fuel when the electromagnetic valve 5a is energized.

The electromagnetic valve 5a opens or closes a low-pressure passage leading from a pressure chamber, to which the high pressure of the fuel in the common rail 2 is applied, to a low-pressure side. The electromagnetic valve 5a opens the low-pressure passage when the electromagnetic valve 5a is energized, and the electromagnetic valve 5a closes the low-pressure passage when the energization is stopped.

The nozzle 5b incorporates a needle for opening or closing an injection hole. The fuel pressure in the pressure chamber biases the needle in a valve closing direction, or a direction for closing the injection hole. Therefore, if the low-pressure passage is opened by energizing the electromagnetic valve 5a and if the fuel pressure in the pressure chamber decreases, the needle ascends in the nozzle 5b and opens the injection hole. Thus, the high-pressure fuel supplied from the common rail 2 is injected through the injection hole. To the contrary, if the low-pressure passage is closed by stopping the energization to the electromagnetic valve 5a and if the fuel pressure in the pressure chamber increases, the needle descends in the nozzle 5b and closes the injection hole. Thus, the injection is stopped.

The ECU 6 is connected with a rotation speed sensor 18 for sensing engine rotation speed (rotation speed per one minute) ω, an accelerator position sensor for sensing an accelerator position (an engine load) ACCP, a pressure sensor 7 for sensing the rail pressure P, and the like. The ECU 6 calculates the target rail pressure of the common rail 2, the injection timing and the injection quantity suitable for the operating state of the engine 1 and the like based on the sensor information sensed through the above sensors. The ECU 6 electronically controls the electromagnetic flow control valve 14 of the fuel supply pump 4 and the electromagnetic valves 5a of the injectors 5 based on the result of the calculation.

In the injection quantity control (the control of the injection timing and the injection quantity) performed by the ECU 6, when the pilot injection of a small amount of the fuel is performed before the main injection, learning of the injection quantity of the pilot injection is performed.

Figure 3:
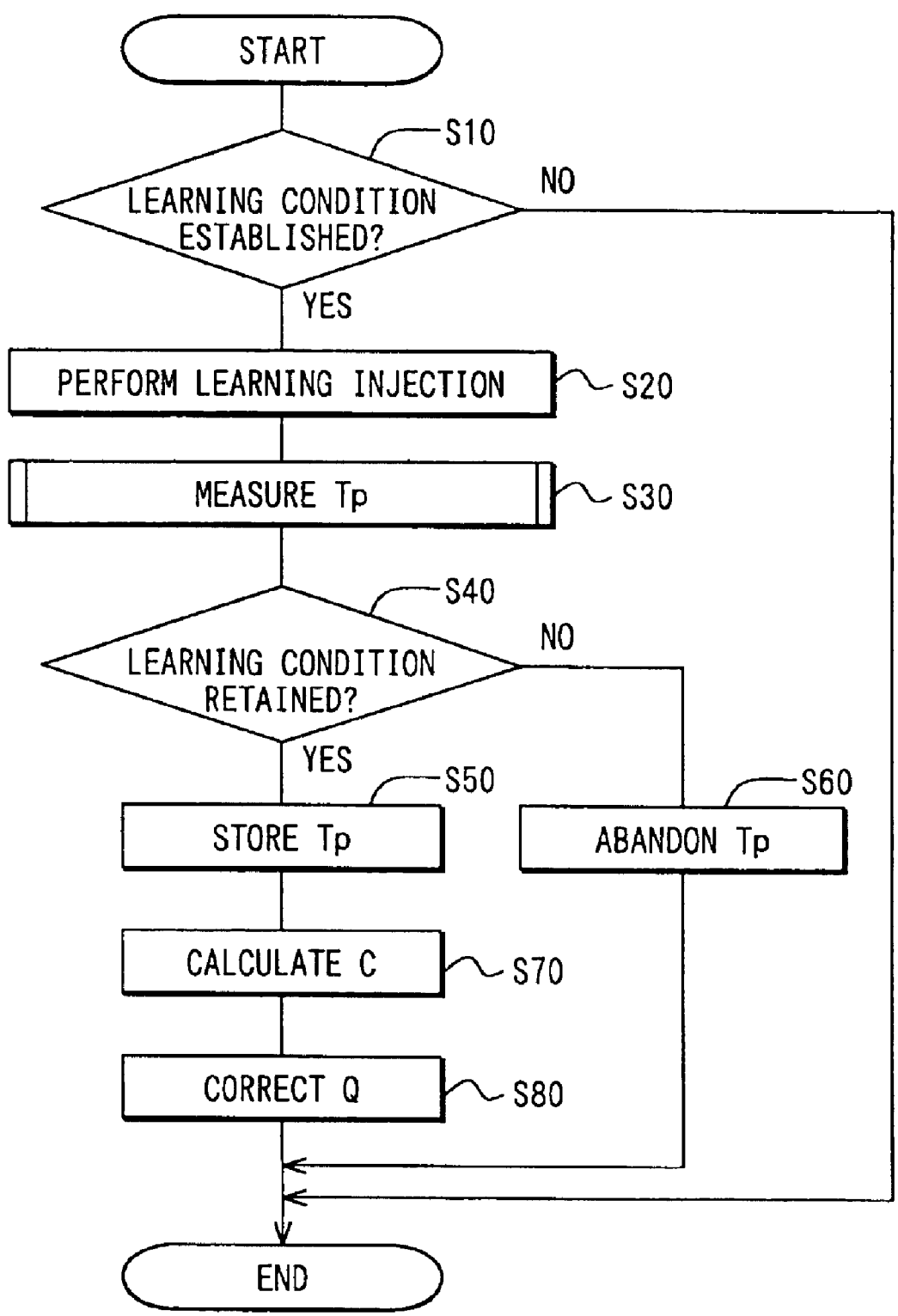
FIG. 3 is a flowchart showing injection quantity learning control performed by an electronic control unit according to the first embodiment.

Next, the processing of injection quantity learning control (control for learning the injection quantity) performed by the ECU 6 will be explained based on the flowchart shown in FIG. 3.

First, in Step S10, it is determined whether the learning conditions for performing the injection quantity learning are established. More specifically, the learning conditions include a condition that the engine 1 is in a no-injection period, in which the command injection quantity of the injector 5 is zero or under, a condition that a transmission is in a neutral state (for instance, during a shifting period), and a condition that a predetermined rail pressure is maintained.

In the case where the engine 1 has an exhaust gas recirculation device (an EGR device), a diesel throttle, a variable turbocharger and the like, an opening degree of an exhaust gas recirculation valve (an EGR valve), an opening degree of the diesel throttle, an opening degree of the variable turbocharger and the like may be added to the learning conditions. If the result of the determination in Step S10 is "YES", the processing proceeds to Step S20. If the result of the determination in Step S10 is "NO", the processing is ended.

The condition that the transmission is in the neutral state is established when a shift position (a manipulated position of a shift lever) is at a neutral position, or when a clutch is in an off state, that is, when engine motive energy is not transmitted to driving wheels (in this case, the shift position need not be at the neutral position necessarily), for instance.

Figure 2:
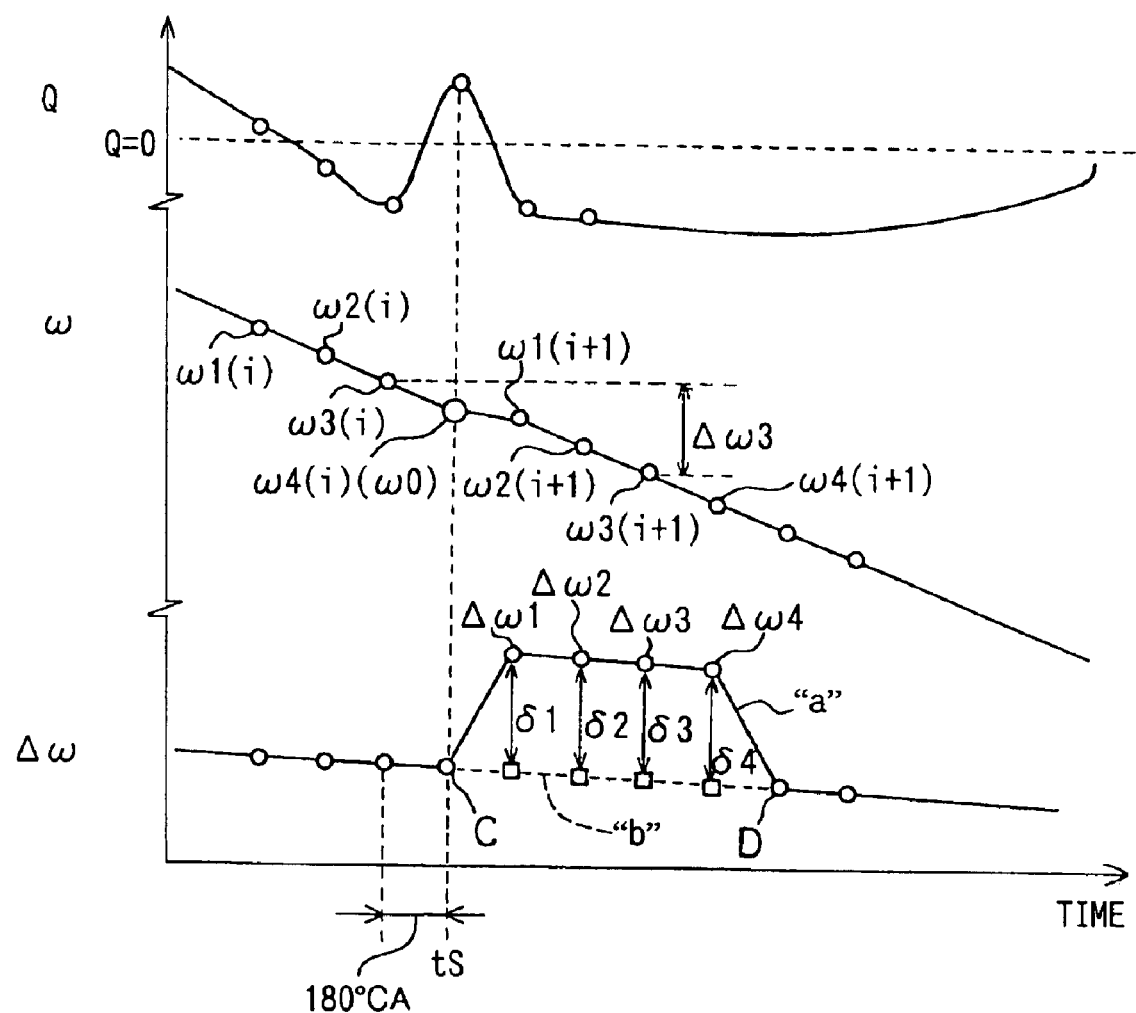
FIG. 2 is a time chart showing a behavior of engine rotation speed at the time when a single-shot injection is performed in the diesel engine according to the first embodiment.

In Step S20, the learning injection, or a single-shot injection, is performed at a time point tS in FIG. 2. The fuel quantity injected through the single-shot injection corresponds to the command injection quantity of the pilot injection.

Then, in Step S30, a characteristic value (a torque proportional quantity Tp) proportional to engine torque (generated torque) generated by performing the single-shot injection is measured. A measuring method of the torque proportional quantity Tp will be explained after.

Then, in Step S40, it is determined whether the processing before the torque proportional quantity Tp is measured has been performed under the aimed learning conditions described in Step S10. In Step S40, it is determined whether the learning conditions described in Step S10 have been retained without a resumption of the injection or a change in the rail pressure P while the torque proportional quantity Tp is measured. If the result of the determination in Step S40 is "YES", the processing proceeds to Step S50. If the result of the determination in Step S40 is "NO", the processing proceeds to Step S60.

In Step S50, the torque proportional quantity Tp measured in Step S30 is stored in the memory. Then, the processing proceeds to Step S70.

In Step S60, the torque proportional quantity Tp measured in Step S30 is abandoned. Then, the processing is ended.

In Step S70, the injection correction value C is calculated based on the torque proportional quantity Tp stored in the memory. The injection correction value C is calculated in accordance with a deviation between the quantity of the fuel actually injected through the single-shot injection (an actual injection quantity QA) and the command injection quantity Q which the injector 5 is commanded to inject in order to perform the single-shot injection. The actual injection quantity QA can be estimated from the generated torque T of the engine 1.

Then, in Step S80, the command injection quantity Q of the injector 5 is corrected in accordance with the injection correction value C calculated in Step S70.

Figure 4:
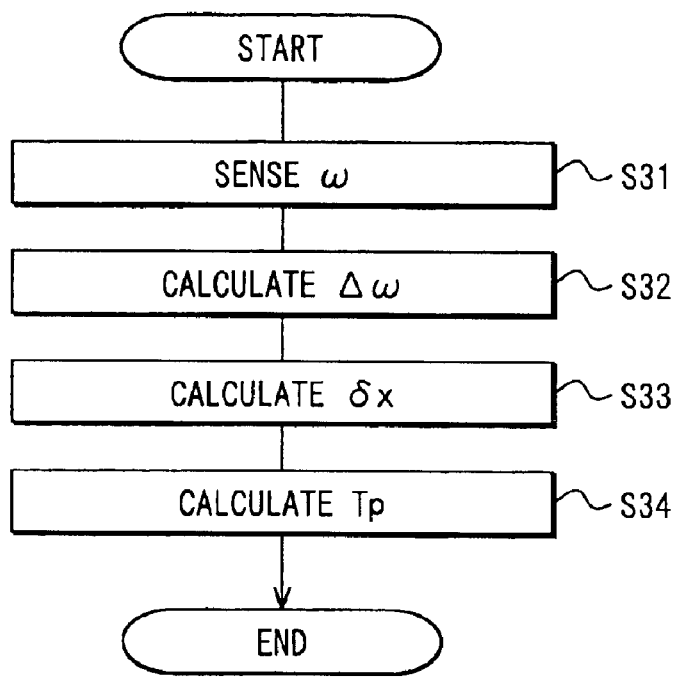
FIG. 4 is a flowchart showing control for calculating a torque proportional quantity performed by the electronic control unit according to the first embodiment.

Next, the measuring method of the torque proportional quantity Tp performed in Step S30 will be explained based on a flowchart shown in FIG. 4.

First, in Step S31, the signal of the rotation speed sensor 18 is inputted to sense the engine rotation speed $\omega$. In the four-cylinder engine 1 of the present embodiment, the engine rotation speed $\omega$ is sensed four times (once for each cylinder) while the crankshaft rotates twice (720° CA). If the number of the cylinder, in which the injection is performed when the engine rotation speed $\omega$ is sensed, is assigned to the sensed value of the engine rotation speed $\omega$, the obtained data will include items $\omega1(i)$, $\omega2(i)$, $\omega3(i)$, $\omega4(i)$, $\omega1(i+1)$, $\omega2(i+1)$, etc. in the time-series order as shown in FIG. 2.

Figure 5:
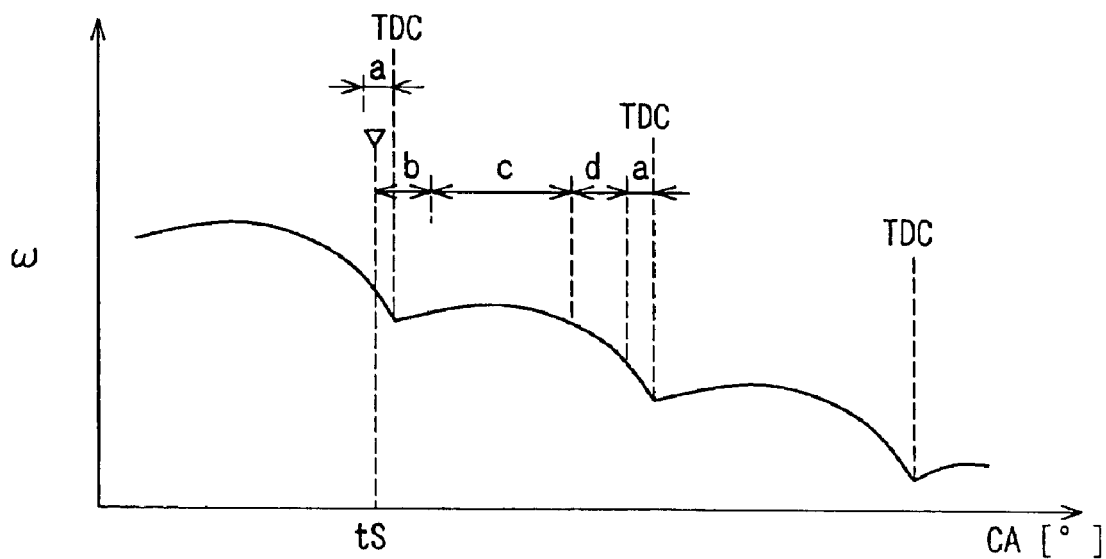
FIG. 5 is a time chart showing sensing timing of engine rotation speed of the diesel engine according to the first embodiment.

As shown in FIG. 5, the engine rotation speed $\omega$ is sensed in a period immediately before the injection timing (a period "a" in FIG. 5) of the injector 5. More specifically, a rotation speed sensing period (a period "d" in FIG. 5) is set after an ignition delay period (a period "b" in FIG. 5), which is necessary for igniting the fuel injected from the injector 5, and after a combustion period (a period "c" in FIG. 5), in which the fuel is actually combusted. Thus, the variation in the engine rotation speed $\omega$ due to the single-shot injection can be sensed accurately.

Then, in Step S32, a rotation speed variation $\Delta\omega$ is calculated for each cylinder. If the third cylinder is taken as an instance, as shown in FIG. 2, a difference $\Delta\omega3$ between the rotation speed $\omega3(i)$ and the rotation speed $\omega3(i+1)$ is calculated as the rotation speed variation $\Delta\omega$. The rotation speed variation $\Delta\omega$ monotonically decreases while the injection is not performed, or in the no-injection period. However, the rotation speed variation $\Delta\omega$ increases once for each cylinder immediately after the single-shot injection is performed. In FIG. 2, the single-shot injection is performed in the fourth cylinder at a time point tS.

Then, in Step S33, rotation speed increases $\delta$ of the respective cylinders caused by the single-shot injection are calculated respectively, and an average $\delta x$ of the rotation speed increases $\delta$ is calculated. The rotation speed increase $\delta$ is calculated as a difference between the variation $\Delta\omega$ calculated in Step S32 and the variation $\Delta\omega$ (the estimated value) in the case where the single-shot injection is not performed. The variation $\Delta\omega$ in the case where the single-shot injection is not performed monotonically decreases while the injection is not performed, or in the no-injection period. Therefore, the variation $\Delta\omega$ in the no-injection period can be easily estimated from the variation $\Delta\omega$ before the single-shot injection is performed or the variations $\Delta\omega$ before and after the time when the engine rotation speed $\omega$ is increased.

Then, in Step S34, the torque proportional quantity Tp is calculated by multiplying the average $\delta x$ calculated in Step S33 by the engine rotation speed $\omega0$ at the time when the single-shot injection is performed. The torque proportional quantity Tp is proportional to the generated torque T of the engine 1 generated through the single-shot injection. More specifically, since the generated torque T of the engine 1 is calculated through a following equation (1), the torque proportional quantity Tp as a product of the average $\delta x$ and the engine rotation speed $\omega0$ is proportional to the generated torque T. In the equation (1), K represents a proportionality factor.

$$T = K \cdot \delta x \cdot \omega 0, \tag{1}$$

Figure 6:
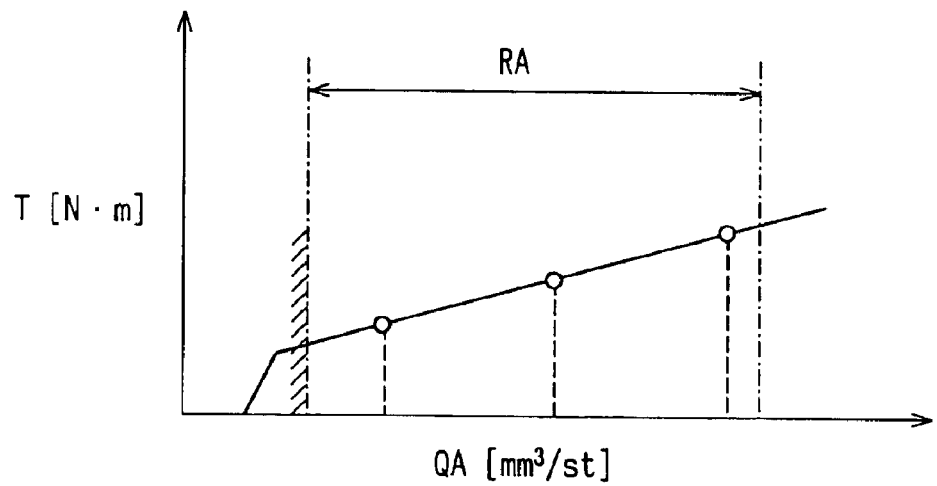
FIG. 6 is a graph showing a relationship between an injection quantity and generated torque of the diesel engine according to the first embodiment.

In the engine 1 (the diesel engine) of the present embodiment, the generated torque T is proportional to the actual injection quantity QA as shown in FIG. 6. The learning of the injection quantity QA is performed in a range "RA" shown in FIG. 6. Accordingly, the torque proportional quantity Tp calculated in Step S34 is also proportional to the actual injection quantity QA. Therefore, the generated torque T can be calculated from the torque proportional quantity Tp, and the actual injection quantity QA can be estimated from the generated torque T.

In the fuel injection system of the present embodiment, the engine torque generated through the single-shot injection can be calculated without being affected by the fluctuation of the loads (for instance, the loads of the air conditioner, the alternator and the like) applied to the engine 1. More specifically, if the engine rotation speed ω0 at the time when the single-shot injection is performed is the same, the rotation speed increase δ is the same independently of the fluctuation in the loads applied to the engine 1. Therefore, the actual injection quantity QA is estimated from the calculated generated torque T, and the difference between the actual injection quantity QA and the command injection quantity Q is sensed as the injection quantity deviation. Then, the command injection quantity is corrected based on the injection quantity deviation. Thus, the learning of the injection quantity can be performed highly accurately without requiring additional devices such as the torque sensor.

In the present embodiment, the actual injection quantity QA is calculated after the generated torque T of the engine 1 is calculated based on the average δx of the rotation speed increases δ. Accordingly, the generated torque T and the injection quantity QA can be easily matched with each other in one-to-one correspondence as shown in FIG. 6. Therefore, the actual injection quantity QA need not be corrected in accordance with the engine rotation speed ω0 at the time when the single-shot injection is performed. As a result, the actual injection quantity QA can be calculated highly accurately.

Moreover, the learning conditions for performing the learning of the injection quantity include at least the condition that the engine 1 is in the no-injection period and the transmission is in the neutral state. Therefore, the variation in the rotation speed of the engine 1 caused by the single-shot injection can be sensed accurately. More specifically, in a state in which the connection of the transmission is formed, a rotational inertial force extending from the transmission to the driving wheels is added to the rotational inertial force of the engine itself. In addition, changes in conditions of a road surface and the like are transmitted to the crankshaft through the driving wheels and the transmission system. Therefore, it is difficult to accurately sense the variation in the rotation speed of the engine 1 caused by the single-shot injection. Therefore, by performing the single-shot injection in the neutral state of the transmission, the pure variation in the rotation speed of the engine 1 caused by the single-shot injection can be grasped. Thus, the accuracy of the learning can be improved compared to the case where the injection quantity learning is performed in a state in which the connection of the transmission is formed.

Second Embodiment

Next, a method of estimating the actual injection quantity QA performed by the ECU 6 according to a second embodiment of the present invention will be explained based on FIG. 7.

Figure 7:
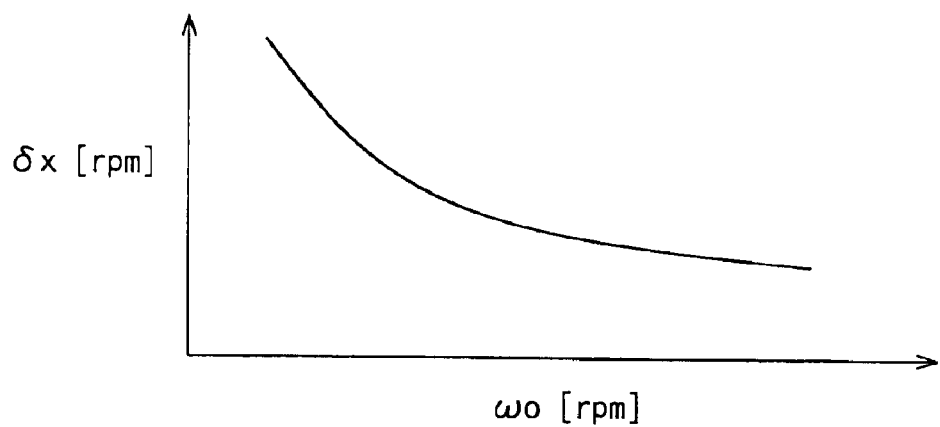
FIG. 7 is a map for matching a rotation speed increase with engine rotation speed of the diesel engine according to a second embodiment of the present invention.

In the second embodiment, the average δx of the rotation speed increases δ caused by the single-shot injection is calculated in Step S33 of the first embodiment, and then, the actual injection quantity QA is estimated based on a map shown in FIG. 7.

The map shown in FIG. 7 stores values for preliminarily matching the average δx of the rotation speed increases δ with the engine rotation speed ω0, which is sensed when the single-shot injection is performed, for each injection quantity. Therefore, the actual injection quantity QA can be calculated from the map in accordance with the average δx of the rotation speed increases δ and the engine rotation speed ω0 at the time when the learning injection is performed.

Modification

In the first embodiment, the learning of the injection quantity of the pilot injection is performed. Alternatively, the present invention may be applied to learning of an injection quantity of a normal injection without the pilot injection (an injection performed only once during one combustion stroke in one cylinder of the engine 1), learning of an injection quantity of the main injection performed after the pilot injection, or learning of an after injection performed after the main injection.

When the generated torque T of the engine 1 generated through the single-shot injection is calculated, the average δx of the rotation speed increases δ of the respective cylinders is used. Alternatively, instead of calculating the average δx, the generated torque T may be calculated in accordance with the rotation speed increase δ of one of the cylinders.

Figure 8:
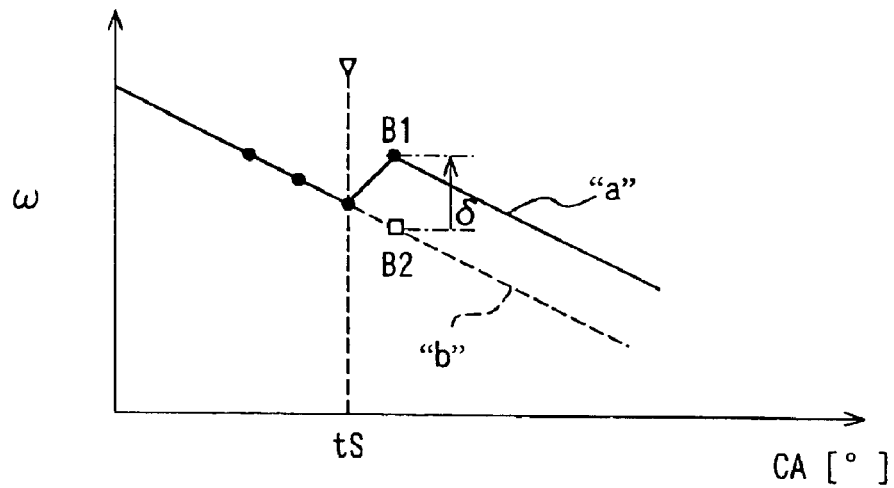
FIG. 8 is a graph showing engine rotation speed in the case where a single-shot injection is performed in the diesel engine of a modified example of the first embodiment.

In Step S33 of the first embodiment, the difference between the variation Δω (calculated in Step S32) in the case where the single-shot injection is performed and the variation Δω (the estimated value) in the case where the single-shot injection is not performed is calculated as the rotation speed increase δ. Alternatively, as shown in FIG. 8, a difference between the engine rotation speed ω shown by a point B1, which is increased by performing the single-shot injection at a time point tS, and the engine rotation speed ω shown by a point B2 in the case where the single-shot injection is not performed at the same time point tS may be calculated as the rotation speed increase δ.

The engine rotation speed ω in the case where the single-shot injection is not performed can be easily estimated from the engine rotation speed ω at the time before the single-shot injection is performed. Alternatively, the engine rotation speed ω in the case where the single-shot injection is not performed can be estimated from the rotation speed variations Δω before and after the time when the rotation speed ω is increased by the single-shot injection (for instance, the variation Δω before the point C and the variation Δω after the point D in FIG. 2).

In the above embodiments, the difference (the injection correction value C) between the actual injection quantity QA of the fuel actually injected from the injector 5 in the single-shot injection and the command injection quantity Q used when the injector 5 is commanded to perform the single-shot injection is calculated, and the command injection quantity Q is corrected based on the injection correction value C. Instead of comparing the actual injection quantity QA with the command injection quantity Q, a value related to the injection quantity may be used in the learning of the injection quantity. For instance, an injection pulse and the like may be used in the learning of the injection quantity.

The present invention can be applied to a fuel injection system other than the accumulation type (common rail type) fuel injection system explained in the first embodiment. For instance, the present invention can be applied to a fuel injection system including a distribution-type fuel injection pump having an electromagnetic spill valve.

The present invention should not be limited to the disclosed embodiments, but may be implemented in many other ways without departing from the spirit of the invention.

What is claimed is:

1. A fuel injection control device of an internal combustion engine, the fuel injection control device comprising:

determining means for determining whether a learning condition for performing a learning injection in a specific cylinder of the engine through an injector is established, the learning injection being performed to learn a fuel injection quantity;

commanding means for commanding the injector to perform the learning injection in the specific cylinder when the learning condition is established;

sensing means for sensing rotation speed of the engine as engine rotation speed;

first calculating means for calculating a difference between a variation in the engine rotation speed in the case where the learning injection is performed and a variation in the engine rotation speed in the case where the learning injection is not performed in the specific cylinder as a rotation speed increase;

second calculating means for calculating an actual injection quantity of the fuel actually injected from the injector or an actual injection quantity related value related to the actual injection quantity, based on the calculated rotation speed increase; and third calculating means for calculating a difference between the calculated actual injection quantity and a command injection quantity which the injector is commanded to inject or a difference between the calculated actual injection quantity related value and a command injection quantity related value related to the command injection quantity as an injection correction value.

2. The fuel injection control device as in claim 1, wherein the determining means determines that the learning condition is established at least when the engine is in a no-injection period, in which the command injection quantity is zero or under.

3. The fuel injection control device as in claim 1, wherein the determining means determines that the learning condition is established at least when the engine is in a no-injection period, in which the command injection quantity is zero or under, and a transmission is in a neutral state.

4. The fuel injection control device as in claim 1, wherein the second calculating means calculates generated torque of the engine generated through the learning injection based on the calculated rotation speed increase, and calculates the actual injection quantity or the actual injection quantity related value from the generated torque.

5. The fuel injection control device as in claim 1, wherein the second calculating means stores a map, in which the rotation speed increase and the engine rotation speed at the time when the learning injection is performed are matched with each other for each injection quantity or for each injection quantity related value related with the injection quantity, and calculates the actual injection quantity or the actual injection quantity related value in accordance with the calculated rotation speed increase and the engine rotation speed at the time when the learning injection is performed, based on the map.

6. The fuel injection control device as in claim 4, wherein the second calculating means calculates a product of the calculated rotation speed increase and the engine rotation speed at the time when the learning injection is performed as a torque proportional quantity, which is proportional to the generated torque of the engine.

7. The fuel injection control device as in claim 6, wherein the second calculating means calculates the torque proportional quantity in accordance with the engine rotation speed sensed immediately before injection timing of each cylinder of the engine.

8. The fuel injection control device as in claim 6, wherein the second calculating means calculates the torque proportional quantity in accordance with an average of the rotation speed increases of the respective cylinders of the engine.

9. The fuel injection control device as in claim 1, further comprising:

correcting means for correcting the command injection quantity based on the injection correction value calculated by the third calculating means.

10. The fuel injection control device as in claim 1, wherein the commanding means commands the injector to perform the learning injection so that the injector injects a quantity of the fuel corresponding to an injection quantity of a pilot injection, which is performed before a main injection.

11. The fuel injection control device as in claim 1, wherein the actual injection quantity related value includes an injection quantity corresponding value corresponding to the actual injection quantity or an injection pulse corresponding value corresponding to an injection pulse.

12. A fuel injection control device of an internal combustion engine, the fuel injection control device comprising:

determining means for determining whether a learning condition for performing a learning injection in a specific cylinder of the engine through an injector is established, the learning injection being performed to learn a fuel injection quantity;

commanding means for commanding the injector to perform the learning injection in the specific cylinder when the learning condition is established;

sensing means for sensing rotation speed of the engine as engine rotation speed;

first calculating means for calculating a difference between the engine rotation speed in the case where the learning injection is performed and the engine rotation speed in the case where the learning injection is not performed in the specific cylinder as a rotation speed increase;

second calculating means for calculating an actual injection quantity of the fuel actually injected from the injector or an actual injection quantity related value related to the actual injection quantity based on the calculated rotation speed increase; and third calculating means for calculating a difference between the calculated actual injection quantity and a command injection quantity which the injector is commanded to inject or a difference between the calculated actual injection quantity related value and a command injection quantity related value related to the command injection quantity as an injection correction value.

13. The fuel injection control device as in claim 12, wherein
the determining means determines that the learning condition is established at least when the engine is in a no-injection period, in which the command injection quantity is zero or under.

14. The fuel injection control device as in claim 12, wherein
the determining means determines that the learning condition is established at least when the engine is in a no-injection period, in which the command injection quantity is zero or under, and a transmission is in a neutral state.

15. The fuel injection control device as in claim 12, wherein
the second calculating means calculates generated torque of the engine generated through the learning injection based on the calculated rotation speed increase, and calculates the actual injection quantity or the actual injection quantity related value from the generated torque.

16. The fuel injection control device as in claim 12, wherein
the second calculating means stores a map, in which the rotation speed increase and the engine rotation speed at the time when the learning injection is performed are matched with each other for each injection quantity or for each injection quantity related value related with the injection quantity, and calculates the actual injection quantity or the actual injection quantity related value in accordance with the calculated rotation speed increase and the engine rotation speed at the time when the learning injection is performed, based on the map.

17. The fuel injection control device as in claim 15, wherein
the second calculating means calculates a product of the calculated rotation speed increase and the engine rotation speed at the time when the learning injection is performed as a torque proportional quantity, which is proportional to the generated torque of the engine.

18. The fuel injection control device as in claim 17, wherein
the second calculating means calculates the torque proportional quantity in accordance with the engine rotation speed sensed immediately before injection timing of each cylinder of the engine.

19. The fuel injection control device as in claim 17, wherein
the second calculating means calculates the torque proportional quantity in accordance with an average of the rotation speed increases of the respective cylinders of the engine.

20. The fuel injection control device as in claim 12, further comprising:
correcting means for correcting the command injection quantity based on the injection correction value calculated by the third calculating means.

21. The fuel injection control device as in claim 12, wherein
the commanding means commands the injector to perform the learning injection so that the injector injects a quantity of the fuel corresponding to an injection quantity of a pilot injection, which is performed before a main injection.

22. The fuel injection control device as in claim 12, wherein
the actual injection quantity related value includes an injection quantity corresponding value corresponding to the actual injection quantity or an injection pulse corresponding value corresponding to an injection pulse.

* * * * *